May 14, 1957  W. C. FISCHER  2,791,988
DUAL FUEL INTERNAL COMBUSTION ENGINE
Filed Nov. 22, 1952  4 Sheets-Sheet 1

INVENTOR
WALTHER C. FISCHER
BY
Paul L. Kroher
ATTY.

INVENTOR
WALTHER C. FISCHER
BY
ATTY.

May 14, 1957  W. C. FISCHER  2,791,988
DUAL FUEL INTERNAL COMBUSTION ENGINE
Filed Nov. 22, 1952  4 Sheets-Sheet 3
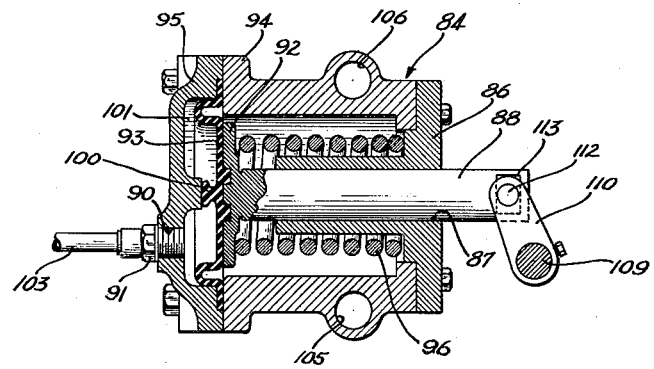
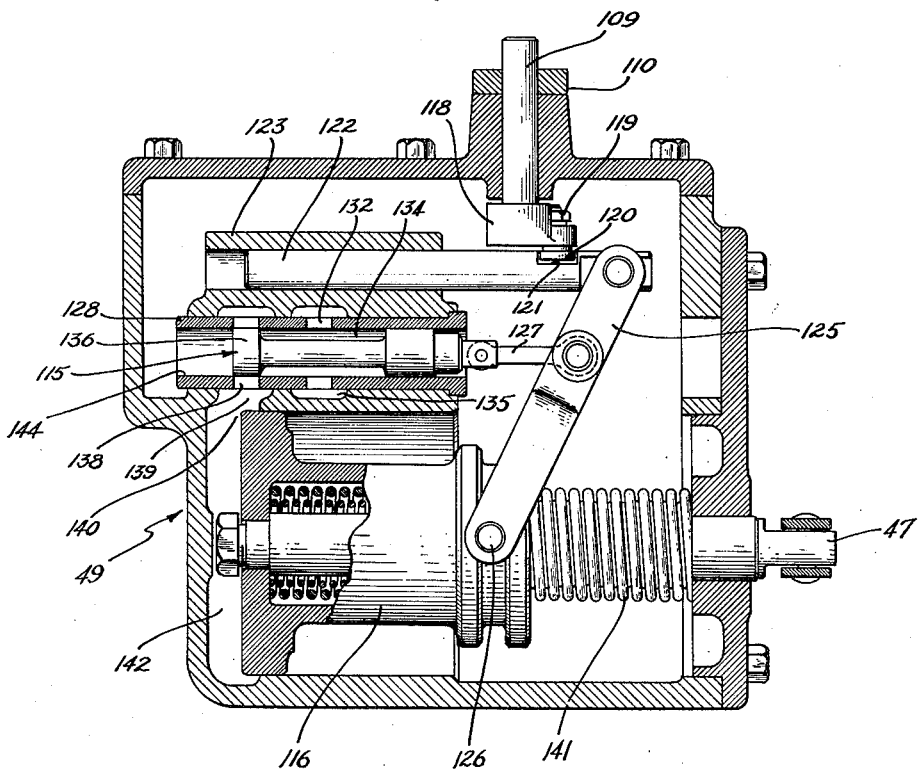
INVENTOR
WALTHER C. FISCHER
BY
ATTY.

May 14, 1957 W. C. FISCHER 2,791,988
DUAL FUEL INTERNAL COMBUSTION ENGINE
Filed Nov. 22, 1952 4 Sheets-Sheet 4
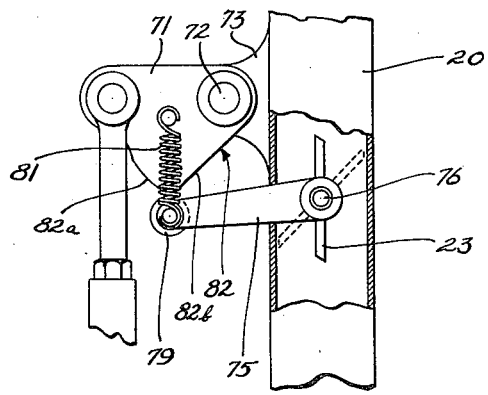
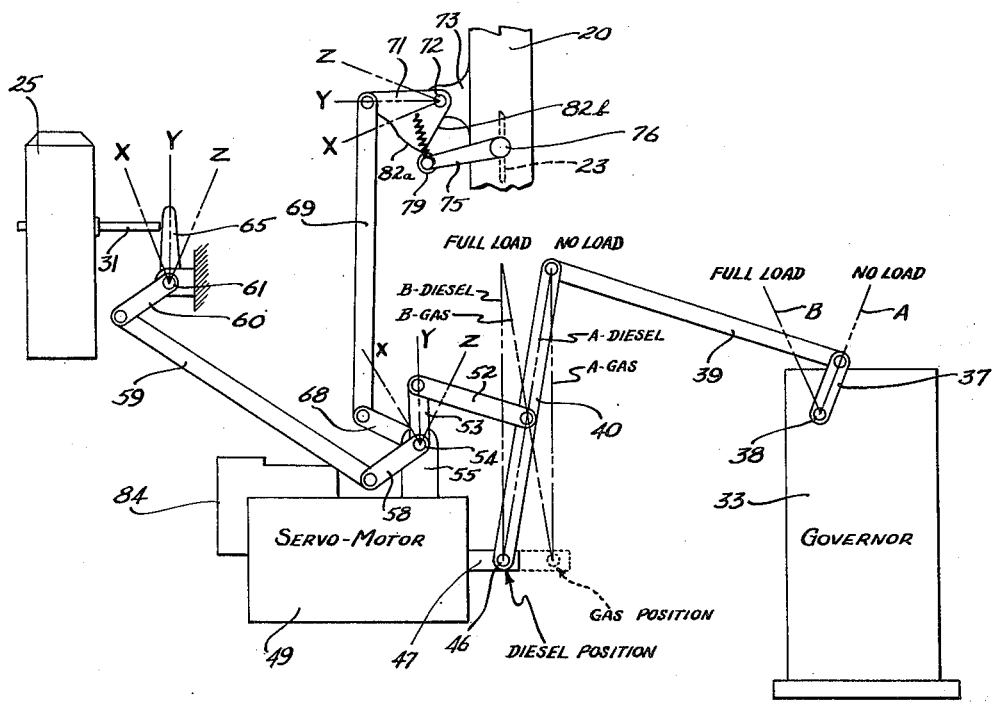
INVENTOR
WALTHER C. FISCHER
BY Paul L. Keeler
ATTY.

United States Patent Office 2,791,988
Patented May 14, 1957

2,791,988
DUAL FUEL INTERNAL COMBUSTION ENGINE

Walter C. Fischer, Beloit, Wis., assignor to Fairbanks, Morse & Co., Chicago, Ill., a corporation of Illinois Application November 22, 1952, Serial No. 322,115

12 Claims. (Cl. 123—27)

This invention relates to improvements in internal combustion engines, and more particularly to an improved fuel control system for dual fuel engines.

In known and heretofore prevailing forms of fuel control systems employed with dual fuel engines intended for operation on liquid fuel, as a diesel, or on suitable gaseous fuel usually with liquid fuel pilot ignition, it has been the practice to afford engine governor regulation of the fuel system in a manner such that a part of the full range of governor actuation is utilized for fuel system control of one fuel, while the remainder of the governor range of actuation provides fuel system control in respect to the other fuel. A major disadvantage of such arrangements is the difficulty of securing adequate sensitivity and accuracy of governor regulation of the fuel system, since the governor has to be adapted for the split-range character of regulating displacement as indicated. Accordingly, it is one important object of the present invention to provide a dual fuel control system adapted for regulation response to governor operation through one and the same range in engine operation on either fuel. Thus with the present system adapted for operative association with a single range governor, governor regulation of the system may be effected more accurately and with greater sensitivity to engine speed variations.

Another important object of the present invention is to provide an improved fuel control system in operative association with a regulating governor of single range character as indicated, wherein the system functions automatically in response to complete or partial failure of gaseous fuel supply to the engine, to establish governor-regulated engine fueling on liquid fuel alone upon complete gas failure, or on both gas and liquid fuels upon partial failure of gas fuel, with the liquid fuel supplied in regulated quantity proportionate to the insufficiency of the gas supply to the engine.

A further object is to provide an automatic fuel control system of the character indicated, affording governor-responsive fuel control in engine operation as a diesel on liquid fuel injection alone, or selectively, governor-responsive fuel control in engine operation on a gaseous fuel with liquid fuel delivery in predetermined pilot quantity for gas fuel ignition, and wherein the system operates automatically in response to partial failure of gas supply to the engine, to establish liquid fuel delivery to the engine in proportion to the deficiency of gas fuel, or in the event of complete failure of gas supply, to continue engine operation on liquid fuel alone.

Other and further features, objects, and advantages of the present invention will be apparent to one skilled in the art from the following detail description taken in connection with the accompanying drawings, wherein:

Fig. 5 is a sectional view taken on line 5—5 of Fig. 4.

Fig. 6 is a horizontal sectional view taken on line 6—6 of Fig. 3.

Fig. 7 is a schematic illustration of the fuel control linkage of the present invention, showing several operating positions of the linkage.

Fig. 8 is an enlarged elevational view, partly in section, of a portion of the control linkage of Fig. 7.

Figure 2:
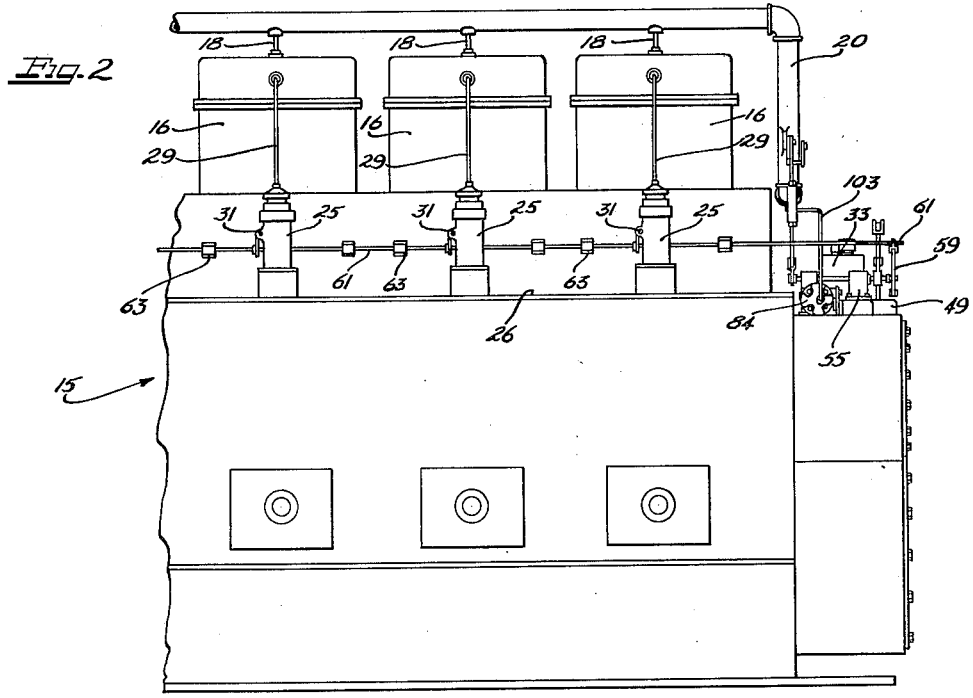
Fig. 2 is a fragmentary side elevation of the engine as viewed from the line 2—2 in Fig. 1.
Figure 1:
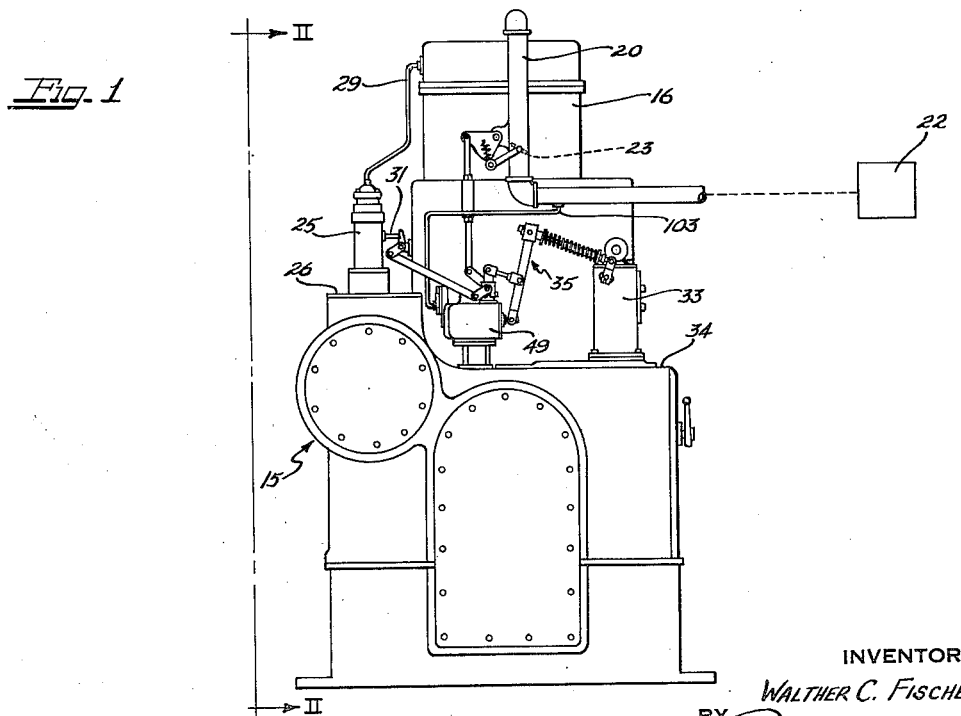
Fig. 1 is an end elevation of an internal combustion engine provided with a fuel control system constructed according to the teachings of the present invention.

In Figs. 1 and 2 the reference numeral 15 indicates generally, a typical dual fuel engine having a plurality of in-line cylinders 16. Gaseous fuel is supplied to each cylinder through a branch conduit 18 leading from a gaseous fuel header 20. The header may be supplied from any suitable source of gas supply 22 under suitable pressure. A throttle valve 23 disposed in the header 20 and automatically operated as will appear presently, controls the quantity of gaseous fuel passing therethrough.

Liquid fuel as a suitable fuel oil, is delivered to the cylinders by means of fuel pumps 25 individual to the cylinders, mounted on a ledge or frame part 26 of the engine. Each pump discharges into a fuel line 29 which is connected in the usual manner to an injector (not shown) arranged to spray liquid fuel into the combustion chamber (not shown) of the associated cylinder. Each fuel pump 25 has a control rack 31 slidably mounted in the body of the pump, by which the quantity of fuel discharged to the injector can be varied.

Figure 4:
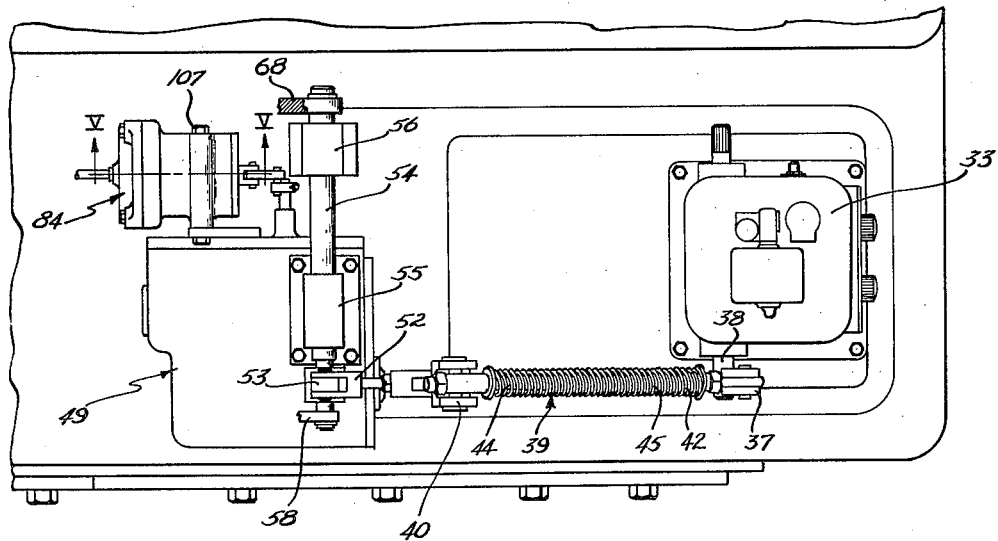
Fig. 4 is a top plan view as taken from line 4—4 of Fig. 3.
Figure 3:
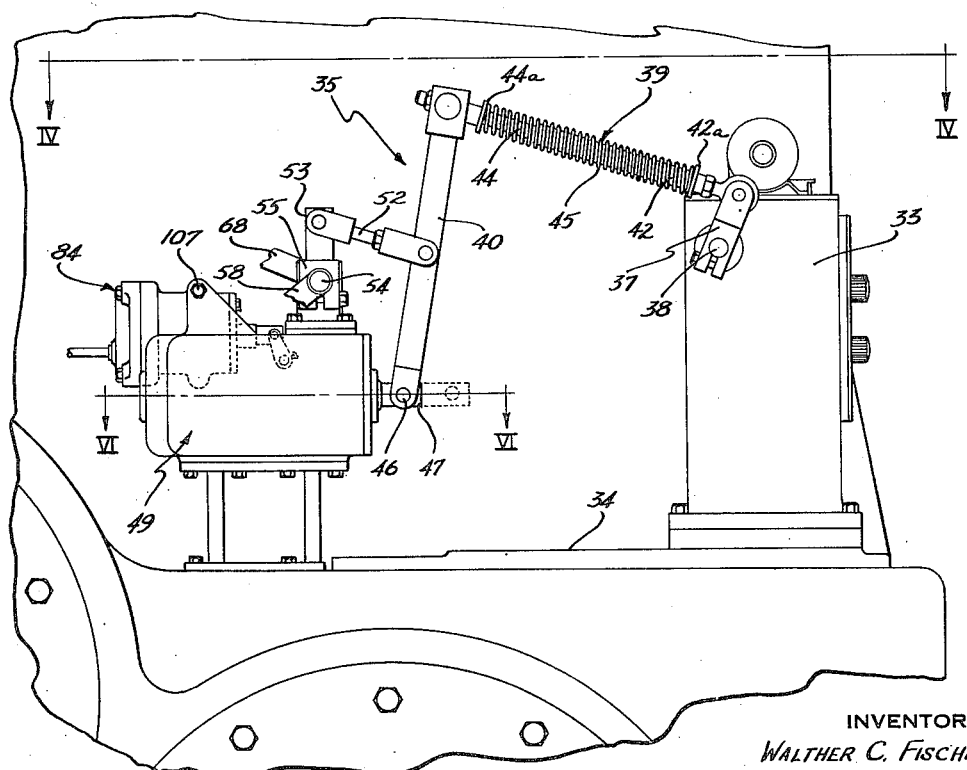
Fig. 3 is a view in enlarged elevation, of a portion of the control mechanism shown in Fig. 1.

Included in the engine organization is an engine speed responsive governor 33, preferably mounted on a frame part 34 of the engine, provided for controlling the setting of both the fuel pump racks and the gaseous fuel throttle valve 23 through a lever system or control linkage 35. In accordance with the present invention, the governor 33 is of a single control range type providing an output control lever or arm 37 secured to the governor output shaft element 38, wherein the arm 37 is movable in a single control range extending from an initial position corresponding to no-load engine operation as shown in Fig. 7, to an opposite terminal position corresponding to maximum or full-load engine operation. As best seen in Figs. 3, 4, and 7, the linkage 35 includes a composite push rod 39 which connects the governor arm 37 to a primary pivoting lever 40, said rod 39 including a hollow tubular portion 42 pivotally mounted on the arm 37, a rod-like portion 44 that telescopes at one end inside the tube 42 and, at the other end, is pivotally mounted on the lever 40, and a coil spring 45 disposed between collars 42a and 44a formed on the portions 42 and 44 respectively. At its lower end the lever 40 is pivotally mounted at point 46 on a rod 47 that extends from a servo-motor 49, the rod 47 providing a shiftable fulcrum element for lever 40 as will appear hereinafter. The servo-motor 49, which is mounted on the ledge 34, may be of any well known construction, preferably of hydraulically operated type. In the present invention the rod 47 is moved in and out of the servo-motor 49, as to shift the pivot point 46 of the lever 40, in response to variations of gaseous fuel pressure in the header 20, as this will be more fully explained hereinafter.

The lever 40 actuates the pump control racks and the gas throttle valve through a link 52 which is pivotally connected at one end to the lever 40 and at its other end to an arm 53 that is keyed to a shaft 54. The shaft 54 is journalled for rotation in a bearing 55, Fig. 4, mounted on top of the servo-motor, and in a bearing 56 supported from and in spaced relation above the ledge 34.

Rotary movement of the shaft 54 effects adjustment of the control racks by means of an arm 58 keyed to one end of the shaft 54, and a link 59 which is pivotally connected at one end to an arm 58 and pivotally connected at the other end to an arm 60 that is keyed to a shaft 61. As seen in Fig. 2, the shaft 61 extends longitudinally of the engine adjacent the fuel pumps 25, and is journalled for rotation in bearing blocks 63 secured to the engine housing. A plurality of upstanding arms 65 are keyed to the shaft 61, one arm adjacent to and in alignment with the control rack 31 of each fuel pump 25. As the shaft 61 is rotated in a counterclockwise direction, as viewed in Fig. 7, the arm 65 will contact the rack 31 and move it toward the left, thereby adjusting the fuel pump for increased fuel discharge. When the arm 65 is rotated in a clockwise direction, the rack 31 will move to the right under the bias of a suitable rack spring (not shown), until it reaches the position indicated in Fig. 7. At this position a stop, not shown, arrests further movement of the rack toward a fuel shut-off position. In engines in which a pilot charge of liquid fuel is used to initiate combustion of the main gas charge, the above mentioned stop will arrest the movement of the rack 31 in a position to determine pump delivery of the desired pilot charge.

Rotary movement of the shaft 54 effects adjusting movement of the gas throttle valve 23 through an arm 68 keyed at one end to the shaft 54 and pivotally connected at the other end to a link 69. The link 69 is pivotally connected to a cam plate 71 that is pivoted at 72 to a projection or ear 73 secured to the outer wall of the gas manifold 20. A valve actuating arm 75, Fig. 8, is keyed exteriorly of the manifold 20 to a shaft 76 that is journalled for rotation in the opposite walls of the manifold. The gas throttle valve 23, which may be of any suitable type and is herein illustrated as a butterfly valve, is disposed in the manifold 20 and is keyed to the shaft 76 for rotation therewith. At its free end, the arm 75 carries a roller 79 which acts as a cam-follower, being urged by a spring 81 into contact with a cam surface 82 formed on the edge of the cam plate 71. The cam surface 82 is comprised of two adjacent surfaces 82a and 82b. The surface 82a describes an arc of a circle which has the pivot point 72 as a center. When the roller 79 rides on this surface, there will be no pivotal movement of the valve actuating arm 75 and, consequently, no movement of the valve 23. The cam surface 82b is inclined steeply, so that upon clockwise movement of the cam plate 71 from its position as viewed in Fig. 8, the roller follows cam surface 82b to cause clockwise rotation of the valve 23 toward the full closed position indicated in dotted lines.

An important feature of this invention is the provision of control means which automatically shifts the engine from operation on gaseous fuel to operation on liquid fuel alone when gaseous fuel is not available, or to operation on both liquid and gas fuels with liquid fuel delivery in proportion to the deficiency of gas fuel delivery to the engine. This automatic shift is effected by means of a control member 84, Figs. 3, 5, and 7, that has an element which is responsive to normal and abnormal conditions of gaseous fuel pressure in the manifold 20, and which is operatively connected, as will be explained presently, to the plunger 47 of the servo-motor 49 for shifting the pivot point 46 to and between the "diesel position" and the "gas position" shown in Fig. 7.

Referring to Figs. 3, 4, 5, and 6, it will be seen that the control member 84 comprises a closed housing 86 having an opening 87 in one wall in which a rod 88 is slidably journalled, and a tapped opening 90 in an opposite wall in which a fitting 91 is disposed. Internally of the housing, the rod 88 has an enlarged head 92 to which the central portion of a flexible diaphragm 93 is secured in any suitable manner. The outer marginal edges of the generally circular diaphragm are clamped between a body portion 94 and a dished out cap 95 of the housing. A spring 96 is disposed inside the housing between one end wall thereof and the enlarged head 92 of the rod 88. The spring normally urges the rod and the diaphragm toward the left, Fig. 5, to bring an abutment member 100, disposed in the center of the diaphragm, against a stop projection extending inwardly from the inner surface of the cap 95. As clearly seen in Fig. 5, a chamber 101 is formed between the diaphragm 93 and the inner surface of the cap 95. A tubular conduit 103 connects the fitting 91 to the gas fuel supply conduit 20 on the gas source side of throttle valve 23, so that gas pressure conditions in the conduit or manifold will be reflected in the chamber 101. The spring 96 and the flexible diaphragm 93 are selected and correlated so that they will yield progressively with increasing gas pressure, thereby causing displacement of the rod 88 outwardly of the housing, with maximum extension thereof corresponding to a predetermined normal maximum gas pressure in the manifold.

The control member 84 has openings 105 and 106 through which a bolt 107 extends for mounting the member on the housing of the servo-motor 49. A shaft 109, Fig. 6, journalled for rotation in one wall of the servo-motor 49, extends exteriorly of the servo-motor and carries an arm 110 keyed thereto. At its free end, the arm 110 has a pin 112 fixed therein which projects into an elongated slot 113 in the arm 88. Thus, when the rod 88 moves in and out of the control member 84, the shaft 109 is oscillated.

The oscillations of the shaft 109 are utilized to shift the plunger of the servo-motor to and between "diesel position" and "gas position," through the shifting of a fluid control valve 115 in the servo-motor. The servo-motor may be of standard or readily available type wherein fluid pressure on a piston 116 causes the adjusting movement of the plunger 47 attached to the piston. A relatively short lever 118, Fig. 6, is keyed at one end to the shaft 109 and, at the other end carries a bolt 119, the head 120 of which extends into a slot 121 in a rod 122 slidably disposed in a guide member 123 which is rigidly secured to or integrally formed with the casing of the servo-motor. Angular movement of the shaft 109 causes a sliding, translatory movement of the rod 122 and a pivoting movement of a lever 125 which is pivotally connected to the rod 122 and fulcrumed on the piston 116 through the yoke type pivotal connection 126. A rod 127 is pivotally connected between an intermediate point of the lever 125 and the valve 115, such that the valve 115 will be moved whenever the shaft 109 is turned.

As shown in Fig. 6, slide valve 115 is in a valve casing sleeve 128 carried by guide member 123, the valve sleeve having pressure fluid intake port means 132 communicating the pressure fluid chamber 134 of the valve with an annular recess 135 in extension 123. Recess 135 is supplied with servo-motor actuating fluid under suitable pressure, from a suitable source (not shown) which may be, for example, the engine lubricating oil supply system. The slide valve head 136 controls port means 138 in the valve sleeve, such port means opening to an annular recess 139 in extension 123 which communicates with cylinder port 140 opening to the servo-motor cylinder chamber 142. Pressure relief of the cylinder chamber, such as to effect return of the piston 116 toward its initial position illustrated in Fig. 6, under the return bias of piston spring 141, is through ports 140, 138, and the open end 144 of valve sleeve 128 from which the fluid may be returned to the supply source in any suitable manner not here shown.

In the initial condition of the servo-motor and its control valve and operating parts, as shown in Fig. 6, the fulcrum element 47 of the primary lever 40 will be in the "diesel position," see Fig. 7. At such time, the gas fuel pressure responsive device 84 (Fig. 5) will have its plunger 88 fully retracted to abutment of the diaphragm stop 100 with the stop projection on casing wall 95, this in the complete absence of any gas fuel pressure in the diaphragm chamber 101. The plunger 88 effective on rod 122 through the heretofore described connection including shaft 109, thus positions the rod in one extreme of its movement, as to the right as viewed in Fig. 6, thereby positioning valve 115 in the neutral position shown, with the valve head 136 closing port means 138. Now upon gas pressure response of the device 84 to displace plunger 88 outwardly of casing 94 to any extent up to maximum projection thereof, in dependence upon the gas pressure in chamber 101, the rod 122 will be displaced correspondingly and to the left (Fig. 6), thereby pivoting lever 125 about its fulcrum 126 on piston 116 to actuate valve 115 to the left. Servo-motor operating fluid under pressure then passes from valve chamber 134 through ports 138 and 140 into chamber 142 to produce outward movement of servo-motor piston 116. As piston 116 moves outwardly, it shifts the fulcrum 126 of lever 125 to the right, thereby effecting through the lever 125 displacement of valve 115 to the right in sleeve 128 until the valve head closes port 138. At that point in valve movement, fluid pressure to the piston 116 ceases and the latter stops in a position in which the opposing forces of the spring 143 and the fluid under pressure then trapped in motor chamber 142, are in equilibrium. The result is that the fulcrum element 47 of lever 40 is then positioned in accordance with the extent of gas pressure actuation of the plunger 88. For example, in maximum displacement response of plunger 88 to normal full gas pressure determined for a given engine installation of the system, resulting in shift of rod 122 to its opposite extreme from the position shown in Fig. 6, the consequent displacement of piston 116 terminated by return of the valve 115 to port closing position, will locate the fulcrum point 46 at the terminal control "gas position" indicated in Fig. 7. On the other hand (displacement of plunger 88 in any degree less than maximum, as in response to gas pressure of less than normal value, will result in servo-motor operation to locate fulcrum point 46 at a corresponding point intermediate the terminal control extremes of "gas position" and "diesel position" shown in Fig. 7. The consequences of any such intermediate positioning of fulcrum 46 will appear presently.

In the operation of the fuel control system as now described and with reference to the schematic showing of Fig. 7, assume first that the engine is to be operated on liquid fuel alone, in the absence of gaseous fuel in the gas manifold 20. Under this condition the fulcrum 46 will be in the terminal control "diesel position," and at engine starting the governor arm 37 will be in the "no load" "A," lever 40 will be in position "A-diesel," lever 53 will be in position "Y," lever 65 will be in the pilot position "Y" wherein the rack 31 is set for pilot injection only, and the cam plate 71 will be in position "Y" wherein the gas throttle valve 23 is in a wide open position. As the load on the engine is increased, the lever 37 moves toward the full load position "B," lever 40 will move toward position "B-diesel," lever 53 will move toward position "X," lever 65 will move toward position "X" effecting movement of the control rack 31 toward full fuel position, and the cam plate 71 moves toward position "X," the gas throttle valve 23 remaining in the full open position due to the fact that the roller 79 moves along the cam surface 82a. Thus, during operation on liquid fuel, the fuel control rack moves from no load to full load setting, using the full swing of the governor control arm, while the gas throttle valve is maintained in a substantially fixed, wide open position.

When gaseous fuel is available in the gas manifold 20, the servo-motor 49 in response to normal full gas pressure operation of control device 84, will shift the plunger 47 to locate the fulcrum point 46 at the opposite terminal control "gas position." When operating on gaseous fuel, at no load the governor arm 37 will be at position "A," the lever 40 will be at position "A-gas," the lever 53 will be at the "Z" position, the lever 65 will be at the "Z" position wherein it is moved away from the fuel rack 31 which then remains in the pilot fuel position, the cam plate 71 will be in the "Z" position wherein the gas throttle valve 23 is held in a minimum or no-load open position by the spring 81. As the load on the engine is increased, the lever 37 moves toward the full load position "B," lever 40 moves toward position "B-gas," lever 53 moves toward the "Y" position, the lever 65 moves toward the "Y" position wherein at full load it just contacts, but does not move the fuel rack 31 from its pilot fuel setting, and the cam plate 71 moves toward the "Y" position whereby the cam roller 79 travels along the inclined cam surface 82b moving throttle valve 23 toward the wide open position. Thus, during operation on gaseous fuel, the diesel fuel control rack does not move from the pilot fuel position, while the gas throttle valve moves between minimum open and full open positions using the full throw of the governor control arm.

If while the engine is operating on gaseous fuel with pilot ignition, the gas supply to the engine should fall below normal full pressure or the supply be cut-off or fail completely for any reason, the control device 84 (Fig. 5) responding to any such change in gas supply, will cause servo-motor operation to shift the fulcrum point 46 of lever 40 away from the 'gas position" (Fig. 7) toward the "diesel position." The extent of fulcrum point shift is in proportion to the degree of gas supply failure and such as to locate the fulcrum point 46 at a position intermediate the indicated extreme positions, wherein the lever 40 conditions the control system for regulation of the liquid fuel pumps 25 through rack actuation by lever 65 in a range less than the full range of the racks, for liquid fuel delivery to the engine in quantity sufficient to make up the deficiency in gas supply, so that the engine then will continue operation on the combination of gas and liquid fuels. In the event of complete failure of gas supply, the resulting shift of the fulcrum point 46 will be to the indicated "diesel position," whereupon the engine continues operation on liquid fuel alone, on the diesel cycle. On the other hand, upon partial or complete restoration of gas supply to the engine, the system will respond such as to decrease proportionately, the liquid fuel supply to the engine, or to reduce the latter to pilot injection with full gas supply.

From the foregoing description it will be seen that there is provided by the present invention, an efficient fuel control system which will operate automatically to shift the engine from operation on liquid fuel to operation on gaseous fuel and vice versa, or to operation on both liquid and gaseous fuels as described, all effected automatically in response to gaseous fuel pressure conditions in the supply conduit or manifold.

It will be understood that modifications and variations may be effected without departing from the scope of the novel concepts of the present invention.

What is claimed is:

1. The combination with a dual fuel internal combustion engine operable on gaseous and liquid fuels and including a gaseous fuel supply conduit, a throttle valve in the conduit, and means including a variable delivery pump for supplying liquid fuel to the engine, the pump having a control member actuatable for regulating fuel quantity delivery by the pump, of an engine speed responsive governor having an output lever movable in a single control range between no-load and full load positions thereof, governor operated mechanism for actuating said throttle valve and said pump control member, said mechanism including a movable fulcrum element, an operating lever in pivotal support on said element, and a link directly connecting said lever and said governor output lever, said movable element in one terminal position conditioning the mechanism through said operating lever, for governor operation thereof to actuate only said throttle valve, the shiftable element in another terminal position conditioning the mechanism through said operating lever, for governor operation thereof to actuate only said pump control member, the shiftable element in intermediate positions between said terminal positions conditioning the mechanism through said operating lever, for governor operation thereof to actuate both said throttle valve and said pump control member, and control means operable automatically in response to variations in a condition of engine supply of gaseous fuel, for determining the position of said movable fulcrum element in respect to its said terminal and intermediate position.

2. The combination with a dual fuel internal combustion engine operable on gaseous and liquid fuels and including a conduit for engnie supply of gaseous fuel under a predetermined normal supply pressure, a throttle valve in the conduit, and liquid fuel supply means including a variable delivery pump having a delivery regulating control member, of an engine speed responsive governor providing an output lever movable through a single control range between no-load and full load position thereof, a lever system actuated from said governor output lever for actuating said throttle valve and said pump control member, the lever system including an operating lever and an element pivotally supporting the lever, said element being movable to either of two terminal control positions and serving in one such control position and through said lever, to condition the lever system for governor operation thereof to actuate said throttle valve, the element in its other terminal control position being effective through said lever, to condition the lever system for governor operation thereof to actuate said pump control member, and means responsive to pressure of gaseous fuel in said conduit, effective automatically in response to pressure-failure of the gaseous fuel supply to position said element in its said other terminal control position, and operating automatically in response to pressure-restoration of gaseous fuel supply substantially to said predetermined normal supply pressure, to position said element in it said one terminal control position.

3. The combination with a dual fuel internal combustion engine operable on gaseous and liquid fuels and including a supply conduit for engine supply of gaseous fuel under a predetermined normal supply pressure, a throttle valve in the conduit, and means for engine delivery of liquid fuel in controllable quantity, said means including a quantity control member, of an engine speed responsive governor having an output element movable in a single range between no-load and fuel load positions thereof, a governor operated lever system for actuating said throttle valve and quantity control member, said lever system providing an operating lever connected to said governor output element and a fulcrum element pivotally supporting the lever, said fulcrum element being movable to either of two terminal control positions whereby to alter the fulcrum point of the lever, the lever system further including a cam member and a cam-follower connected to said throttle valve, said cam and cam-follower operating in governor actuation of the lever system with said fulcrum element in one terminal control position, to effect control displacement of said throttle valve, and said cam and cam-follower being ineffective in governor actuation of the lever system with said fulcrum element in its other terminal control position, to produce control displacements of the throttle valve, means biasing said fulcrum element to its said other terminal control position, and control means operable in response to said predetermined normal supply pressure of the gaseous fuel in supply to the engine, to dispose said fulcrum element in its said one terminal control position.

4. The combination with a dual fuel internal combustion engine operable on gaseous fuel, liquid fuel or a combination of both such fuels, and including a conduit for supplying gaseous fuel under pressure to the engine, a throttle valve in the conduit, and means for delivering liquid fuel to the engine, said means including an adjustable delivery fuel pump having a control element operable for regulating fuel quantity delivery by the pump, of an engine speed responsive governor having a control lever movable through a single control range, lever mechanism operated by the governor control lever for actuating said throttle valve and pump delivery control element, said lever mechanism including a primary lever and a lever fulcrum element pivotally supporting the primary lever, the fulcrum element being movable to first and second terminal control positions and to control positions intermediate the terminal control positions, said primary lever being effective upon location of its said fulcrum element in said first terminal position, to condition the lever mechanism for governor operation thereof through said governor control lever operating in said single control range, to effect actuation of said pump control element in liquid fuel operation of the engine, and being effective upon location of its said fulcrum element in said second terminal position, to condition the lever mechanism for governor operation thereof through said governor control lever operating in said single control range, to effect actuation of said throttle valve in gaseous fuel operation of the engine, said primary lever further being effective upon location of its said fulcrum element in a control position intermediate said terminal positions, to condition the lever mechanism for governor operation thereof through said governor control lever operating in said single control range, to effect conjoint actuation of said throttle valve and pump control element in engine operation on combined gaseous and liquid fuels, and means responsive to a condition of engine supply of gaseous fuel, for determining said terminal and intermediate positioning of said fulcrum element.

5. The combination with a dual fuel internal combustion engine operable on gaseous fuel, liquid fuel or a combination of both such fuels, and including means for supplying gaseous fuel under pressure to the engine including a gaseous fuel supply control member, and means for supplying liquid fuel to the engine including a liquid fuel supply control member, of an engine-speed responsive governor having a control element movable through a single control range, adjustable operating means between the governor control element and said control members, including an adjustment control lever, a member providing pivotal support of said lever and movable to opposite terminal control positions and to control positions intermediate said terminal positions, said lever in one terminal control position of its said pivotal support member, adjusting the operating means for governor actuation thereof through said governor control element in said single control range, to effect fuel supply control operation of only said gaseous fuel supply control member, the control lever being effective in the opposite terminal control position of its said pivotal support member, to adjust the operating means for governor actuation thereof through said governor control element operating in said single control range, to produce fuel supply control operation of only said liquid fuel supply control member, and the control lever being effective in disposition of its said pivotal support member in a position intermediate the said terminal positions thereof, to adjust the operating means for governor actuation thereof through said governor control element operating in said single control range, to produce conjoint operation of the liquid and gaseous fuel supply control members in engine operation on both fuels, with the supply of liquid and gaseous fuels relatively proportioned according to the positioning of said pivotal support member intermediate its terminal control positions, and means operable automatically responsively to and in accordance with variations in the supply pressure of the gaseous fuel, for determining the terminal and intermediate positioning of said pivotal support member.

6. The combination with a dual fuel internal combustion engine operable on gaseous fuel, liquid fuel or a combination of both such fuels, and providing means for engine supply of gaseous fuel under pressure including a throttle valve, and means including a supply control member, for supplying liquid fuel to the engine, of an engine-speed responsive governor having a control element movable through a single control range, adjustable operating means between the governor control element and said throttle valve and supply control member, said operating means being adjustable to a first operating condition for governor actuation thereof through said governor control element operating in said single control range, to determine liquid fuel supply control operation of said control member only, the operating means being further adjustable to a second operating condition for governor actuation thereof through said governor control element operating in said single control range, to determine gaseous fuel supply control operation of said throttle valve only, and to any of a plurality of additional operating conditions in each of which governor actuation of the operating means through said governor control element operating in said single control range, determines conjoint operation of said throttle valve and control member for engine operation on both such gaseous and liquid fuels, with the supply of liquid and gaseous fuels relatively proportioned variably in accordance with operating means adjustment to said additional operating conditions, and means operable in accordance with variation in the pressure supply of gaseous fuel to the engine, for effecting said adjustments of the operating means.

7. The combination with a dual fuel internal combustion engine operable on gaseous and liquid fuels and having means for engine-supply of gaseous fuel under pressure and including a throttle valve, and means for supplying liquid fuel to the engine and including a supply control member, of an engine speed responsive governor having an output element movable in a single range between no-load and full load positions, a member movable to any one of a plurality of control positions, a governor actuated lever pivotally carried by said member and connected to said output element, operating means between said lever and said throttle valve and control member, said operating means being effective to actuate said throttle valve and ineffective to actuate said control member in response to governor actuation of said lever by said governor output element operating in said single range, when said movable member is in one control position, and said operating means being effective to actuate said control member and ineffective to actuate said throttle valve in response to governor actuation of said lever by said governor output element operating in said single range, when said movable member is in another control position, the operating means further being effective to actuate said control member and throttle valve conjointly in response to governor actuation of said lever by said governor output element operating in said single range, when said movable member is in any of its control positions other than the aforesaid one and another control positions, the conjoint actuation of the control member and throttle valve differing in the extent of actuation of one relative to the other, in dependence upon the control positioning of said movable member in one and another of its last said control positions, and means operable responsively to variations in the pressure supply of gaseous fuel to the engine, for determining control positionment of said movable member.

8. In a fuel control system for a dual fuel internal combustion engine operable on gaseous and liquid fuels and having gaseous and liquid fuel supply control members, an engine speed responsive governor having an output element movable in a single range between no-load and full load positions, a governor actuated pivotal primary lever connected to said output element, a fulcrum support for said primary lever adjustable to and between opposite terminal positions, operating linkage extending from said primary lever to said supply control members, said linkage in response to governor actuation of the primary lever by said governor output element operating in said single range and with said fulcrum support adjusted to one terminal position, effecting actuation of only one of said supply control members, while in response to governor actuation of the primary lever by said governor output element operating in said single range and with said fulcrum support adjusted to the opposite terminal position, effecting actuation of only the other of said supply control members, and further, said linkage in response to governor actuation of the primary lever by said governor output element operating in said single range and with said fulcrum support adjusted to a position between said terminal positions, effecting conjoint actuation of said control members, and means effective in dependence upon an engine supply condition of gaseous fuel, for determining said positional adjustments of the fulcrum support.

9. In a fuel control system for a dual fuel internal combustion engine operable on gaseous and liquid fuels and having gaseous and liquid fuel supply control members, an engine governor having an output element movable in a single control range between no-load and full load positions, a governor operated primary lever connected to said output element, a rock shaft connected to said lever, the primary lever being adjustable for determining angular displacement of the rock shaft through one and another of a plurality of different ranges of angular displacement, a first operating means between said rock shaft and the gaseous fuel supply control member, effective for actuating said control member responsively to rock shaft displacement through a first angular range and ineffective to actuate the control member in response to rock shaft displacement through a second range, a second operating means between said rock shaft and the liquid fuel supply control member, effective for actuating the control member responsively to rock shaft displacement through said second range and ineffective to actuate the control member in response to rock shaft displacement through said first range, both said operating means being effective to actuate the control members in response to rock shaft displacement in a third angular range, and independent control means responsive to changes in a condition of engine supply of gaseous fuel, for effecting adjustments of said primary lever.

10. The combination with an internal combustion engine operable on gas and liquid fuels and having means for engine delivery of gas fuel under pressure and including a throttle valve, and means for engine delivery of liquid fuel including a delivery control element, of an engine speed responsive governor having an output element operable through a single control range between no-load and full load positions, governor operated mechanism for actuating the throttle valve and control element, comprising a governor operated lever connected to said output element and adjustable for movement thereby in any one of a plurality of distinct ranges of movement, first actuator means for said throttle valve, second actuator means for said control element, means connecting the actuator means to said lever, said first actuator means in response to movement of the lever in one range, producing gas supply control movements of said throttle valve, and being ineffective to move the throttle valve in lever movement through a second range, while said second actuator means is effective to operate said control element in lever movement through said one range, and ineffective to operate said control element in lever movement through said second range, both said actuator means responding to lever movements in a third range to operate the throttle valve and control element, and independent control means responsive to the pressure of the engine gas fuel supply, for effecting range adjustments of said lever.

11. A fuel control system for an internal combustion engine of the type indicated including a gas fuel supply conduit having a throttle valve therein, wherein the system includes an engine speed responsive governor having an output element operable through a single control range, a governor operated primary lever connected to said output element, a variably positionable fulcrum element pivoting said lever, a movable cam element for actuating said throttle valve, lever means connecting said cam element and said primary lever, said lever means in response to governor operation of said primary lever having its pivoting fulcrum element disposed in a first position, moving said cam element in a range to effect gas fuel control operation of the throttle valve, the lever means in response to governor operation of the primary lever having its pivoting fulcrum element disposed in a second position, moving said cam element in another range wherein the cam element is ineffective to produce gas fuel control operation of the throttle valve, and pressure actuated servo-motor means connected between said supply conduit and said fulcrum element operable automatically in response to conditions of gas fuel supply in the conduit, for determining said positions of the fulcrum element.

12. In a fuel control system for an internal combustion engine operable on gas and liquid fuels and including a gas fuel supply conduit having a throttle valve therein, and liquid fuel delivery means including a fuel quantity control member, the system comprising an engine speed responsive governor having an output element operable through a single control range between no-load and full load positions, a governor operated primary lever connected to said output element, a variably positionable fulcrum element pivoting said lever, a movable cam element for actuating said throttle valve, first lever means connecting said cam element and said primary lever, second lever means actuated from said first lever means and extending to the liquid fuel quantity control member, said first lever means operating in response to governor operation of said primary lever by said governor output element operating in said single control range, and with said pivoting fulcrum element disposed in a first position, to move said cam element in a range to effect gas fuel control operation of the throttle valve, the first lever means in so operating, actuating said second lever means in a range wherein it is ineffective to operate the liquid fuel quantity control member, the said first lever means operating in response to governor operation of the primary lever by said governor output element operating in said single control range, and with said pivoting fulcrum element disposed in a second position, to move said cam element in another range wherein it is ineffective to produce gas fuel control operation of the throttle valve, and to actuate the said second lever means in another range wherein it effects liquid fuel quantity control operation of said control member, and pressure actuated servo-motor means connected between said supply conduit and said fulcrum element, operable automatically in response to conditions of gas fuel supply in said conduit, for determining said positions of the fulcrum element.

References Cited in the file of this patent
UNITED STATES PATENTS

| | | |
|---|---|---|
| 2,400,219 | Barnaby et al. | May 14, 1946 |
| 2,400,247 | Miller et al. | May 14, 1946 |
| 2,509,960 | Calhoun | May 30, 1950 |
| 2,612,145 | Steven et al. | Sept. 30, 1952 |
| 2,612,880 | Schowalter | Oct. 7, 1952 |
| 2,690,167 | Moulton | Sept. 28, 1954 |